Dec. 10, 1968   W. BLECKE   3,415,047
MOWER BLADE
Filed April 18, 1966
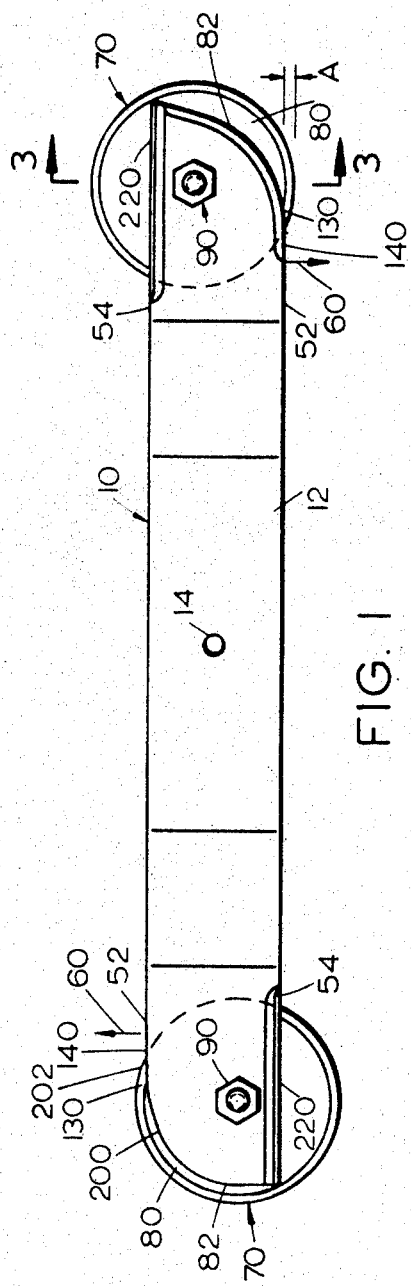
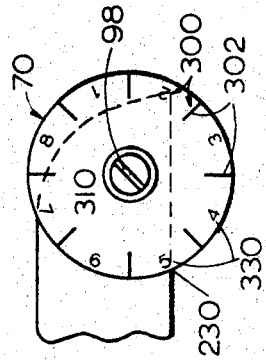
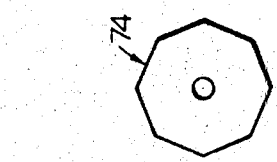
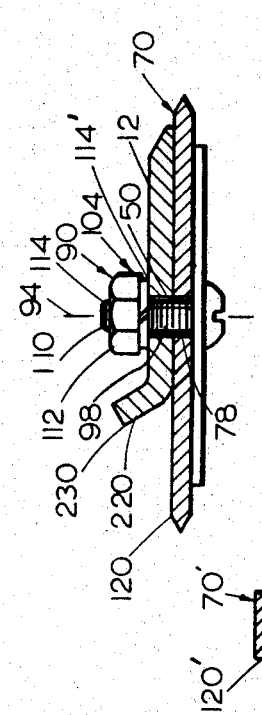
INVENTOR
WILLARD BLECKE

United States Patent Office 3,415,047
Patented Dec. 10, 1968

3,415,047
MOWER BLADE
Willard Blecke, 214 S. Pearl, Wayne, Nebr. 68787
Filed Apr. 18, 1966, Ser. No. 543,256
9 Claims. (Cl. 56—295)

This invention relates to mower blades for rotary mowers and more particularly it is an object of this invention to provide a mower blade having rotatably adjustable cutters at its outer extremities, the cutters being normally fixed to the remainder of the blade in nonroative manner, whereby at any one time, each cutter has only a minor portion of its periphery disposed in a position for cutting.

Heretofore it has been proposed that rotary cutters be mounted on the outer end of a blade in a manner whereby they rotate with respect to the remainder of the blade during rotary cutting movements of the entire blade. This tends to cause the entire cutter periphery to be in continuous use at all times, and it is an object of this invention to selectively place but small portions of the periphery of the cutters into cutting position. By this means, it is an object to make it possible to adjust a cutter position to rotate an entirely new unused cutting portion of its periphery into an outermost position at the forward side of the blade where it will be used for cutting.

Since only the outermost edge of a fast-rotating power mower blade is actually used for cutting, it is an object of this invention to make it possible to replace a dull surface of an adjustably mounted outer cutter and to accomplish this by rotational adjustment as distinguished from a complete removal of the cutter securing bolt and replacing the same through a different hole in a cutter as has been proposed heretofore in the Patent No. 3,103,093 issued Sept. 10, 1963, to W. H. House, Jr., titled: Rotary Cutting Blade.

Still another object is to provide the concept of cutters as described which are of very thin material, whereby they tend to have the effect of being sharper even when dull than is the case with the dull outer end of a standard one-piece rotary cutting blade, which latter would normally be much thicker than the cutter of this invention.

Rotating cutters at blade tips have heretofore extended forwardly of adjacent portions of the forward edge of the remainder of the blade so greatly as to cause substantial catching of blades of grass on the protruding forward edge of the cutter and at a corner formed between the cutter and the forward edge of the mower bar. It is, therefore, an object of this invention to provide a construction in which the cutters are disposed not extending beyond adjacent portions of the forward edge of the bar portion of the blade distances sufficient to cause substantial catching of blades of grass thereagainst.

The prior art shows that rotating cutters at the ends of a mower bar have been proposed before. However, the cutters of the prior art have rotated continuously. This can have the disadvantage that when the cutter strikes grass, the cutting edge is "rotating in a direction away from the grass," even while it is moving toward the grass because it is on the outer edge of the total blade. This "rotating in a direction away from the grass" makes the cutting less effective because when such a blade gets dull, the grass is cut much less well. As an extreme rotational freedom, the rotating cutting discs of prior art blade concepts could allow uncut grass to slip across the discs so freely that even the beating of the grass that would occur would not break off all of it.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawings:
FIGURE 1 is a top plan view of the blade of this invention with the right end of the support bar showing the preferred configuration and the left end showing a modified configuration.

FIGURE 2 is a frontal elevation of the blade.

FIGURE 3 is an enlarged sectional view of the blade as taken along the line 3—3 of FIGURE 1.

FIGURE 4 is a bottom plan view of one end portion of the blade.

FIGURE 5 is a detail showing a octagonal modification of a cutter.

FIGURE 6 is a detail showing an outer edge portion in vertical section of a cutter similar to the outer edge portion of FIGURE 3, but of a modified cutter with unsharpened edge.

Referring to FIGURE 1, a cutting blade of the rotary mower type is there generally indicated at 10 having a main body or bar portion 12 of elongated shape having a central opening 14 extending vertically therethrough to receive the shaft of a power mower in a conventional way.

The bar 12 preferably has a central portion 18, downwardly offset horizontal end portions 30, and interconnecting portions 36 of the bar which incline downwardly and interconnect portions 30 with potrion 18.

As best seen in FIGURE 3, the main body 12 has a vertical attachment opening 50 adjacent each of its ends. The main body 12, as best seen in FIGURE 1, has forward and rearward sides 52 and 54 at each of its ends with respect to the direction of orbit 60.

Cutters 70 are provided, each having a vertical attachment opening 78, as best seen in FIGURE 3.

Each cutter 70 is of circular shape in top plan view or can be octagonal shape as seen in top plan view in FIGURE 5, in which a cutter is shown at 74. It will also be seen that the cutter can be of other shapes, not shown.

Each cutter is disposed in a lapping relationship to its body member, preferably underlapping its respective end of the body member 12. Each cutter has a portion shown at 80 which projects beyond the respective adjacent forward side portions 82 of the body.

Two releasable clamping fastener means 90 are provided, each pivotally connecting a respective one of the cutters 70 to the body 12 for rotation of each cutter about a vertical axis 94, seen in FIGURE 3. However, this rotation does not occur during operation but only during adjustment.

Each fastener means 90 has a vertical portion 98 extending through a respective cutter opening 78 and a respective attachment opening 50.

Each fastener means 90 further has releasable clamping means forming a part thereof, the releasable clamping means being generally indicated at 104 and being adapted to clamp the cutter 70 against the body 12 with a force sufficient for substantially preventing rotation of each cutter about its axis 94 during mowing.

The said vertical portion 98 is preferably the threaded shank of a bolt 110 and the clamping means 90 is preferably formed by a nut 112 and threads 114' on the shank 110. A lock washer 114 between bolt head 112 and bar 12 prevents loosening.

The outermost edge of each cutter is shown at 120 and can be at least sufficiently thin as to effectively cut grass in use, as can be accomplished by providing the cutter with a sharpened edge, all as can be accomplished by providing the cutter with sufficient overall thinness as to gain this cutting effect without sharpening.

An end portion of an unsharpened cutter is shown at 70' in FIGURE 6, having an outer edge 120' which is unsharpened. The thinness of the blade 70' being sufficiently thin as to accomplish cutting without sharpening.

It is important that the periphery of each cutter 70 in an area indicated 130 not extend beyond adjacent portions 140 of the respective forward edge 52 of the body 12 a distance sufficient to cause substantial catching of blades of grass on the cutter 70 between the cutter and the body 12.

Tests have shown that with a cutter of 3" diameter, no substantial catching of grass between the cutter and the adjacent forward side of the body will occur, if the cutter projects 3/16" or less beyond the adjacent forward edge of the body. The question of whether catching of grass is substantial or not, depends on two factors: (A) the amount the cutter projects beyond the respective adjacent forward edge of the body, and (B) the diameter of the cutter.

Referring to FIGURE 1, it will be seen that the cutter 10 has a left end which has an outer end having a forward side portion 82' which has a curved portion 200 of a different curvature than that which is illustrated in the corresponding position on the right end of the cutter of FIGURE 1. The curved edge 200 illustrates that the main body portion can purposely have a shape substantially complemental to the curvature of the outer edge of the respective cutter, whereby the main body can extend closely to the outer edge of the cutter and give it support as is especially valuable when the cutter itself is formed of very thin material as shown at 70' in FIGURE 6.

Referring to FIGURE 4, it will be seen that the cutter has many indicia 300 such as spaced radial marks 302 arranged 45 degrees apart with respect to the axis 310 of the cutter and spaced numerals 330 arranged also 45 degrees apart with respect to the axis 310 and disposed midway between respective marks 302.

In operation, the cutter 70 is rotated until its numeral 1 is opposite a suitable aligning means 230 on the cutter, which latter can be a portion of the rearward edge 54 thereof.

The cutter is then locked in position with a nut 112 and lock washer 114'.

I have found that the majority of the cutting done with a high speed rotary mower going sometimes 3,000 revolutions per minute, more or less, is done by that portion of a cutter which lies in the position of the space 1 (shown in FIGURE 4) in a 45-degree portion of the outer edge of the cutter which lies immediately forward of the outermost portion of the cutter.

When this area has become dull, the operator stops the mower, loosens the nut 112, rotates the cutter 45 degrees further for placing a different numeral 330 opposite the indicator point 230, then again tightens the nut and mows.

This process continues until a cutter needs sharpening. But as it is a preferred plan that the cutter be so thin as not to need sharpening, it can be said this process continues until all parts of the cutters wear back to the main body 12, whereby they then project into positions for cutting. Thereafter the cutters are completely replaced.

It will be seen that the rearward approximately one-third of each cutter is not lapped by any portion of the body member to provide the achievement of economy of manufacture as the body member has lesser width than otherwise.

As thus described, it is believed that this invention has fulfilled the objectives above set forth.

It will be seen that this invention can be changed within the spirit of the following claims and such changes are considered to be within the scope of this invention.

I claim:
1. A cutting blade for a rotary type mower comprising an elongated body having substantially horizontal ends, said body having forward and rearward sides at each of its ends with respect to the direction of orbit and with the rearward side of each end being upturned, cutters having vertical attachment openings, said cutters being disposed one at each end of and lapping said body, said cutters each projecting beyond the respective adjacent forward side portions of said body, two releasable clamping fastener means each pivotally connecting said cutters to said ends for rotation of each cutter about a vertical axis, said fastener means each having a vertical portion extending through a respective cutter opening and a respective attachment opening, said fastener means each further having a releasable clamping means forming a part thereof and adapted to clamp said cutter against said body with a force sufficient for substantially preventing rotation of each cutter about its said axis during mowing, the outer edge of each of said cutters extending beyond said body and being at least sufficiently thin as to effectively cut grass in use.

2. The combination of claim 1 further in combination with the periphery of each said cutters not extending beyond adjacent portions of the respective forward edge of said body a distance sufficient to cause substantial catching of blades of grass on said cutter and between said cutter and said body.

3. The combination of claim 1 further in combination with the rearward approximately one-third of each of said cutters extending beyond said rearward side.

4. The combination of claim 1 further in combination with said cutters being of much lesser vertical thickness than the average vertical thickness of said body member.

5. The combination of claim 1 in which said cutters are circular in top plan and in which adjacent portions of the main body have edges which are complemental to the curvature of the respective cutter for giving the forward edge of the cutter a uniform support, each cutter extending beyond the adjacent curved edge of the main body.

6. The combination of claim 1 in which said cutter has spaced indicia around its circumference for indicating a position of the cutter with respect to the body portion.

7. The combination of claim 1 in which said cutter has spaced indicia around its circumference for indicating a position of the cutter with respect to the body portion, and in which said indicia includes a plurality of sequential numbers.

8. The combination described in claim 7 in which said indicia further include a plurality of radial marks disposed between said numbers, said radial marks being disposed at a spacing of approximately 45 degrees with respect to said cutter axis.

9. The combination of claim 1 in which said cutters are of very much lesser vertical thickness than the average vertical thickness of said body member and further in which the outer edge of said cutters are not sharpened.

References Cited

UNITED STATES PATENTS

| 1,622,611 | 3/1927 | Sera | 56—25.4 |
| 2,071,872 | 2/1937 | Cockburn | 56—25.4 |
| 2,489,730 | 11/1949 | Soenksen | 56—25.4 |
| 2,740,249 | 4/1956 | Stearns | 56—295 |
| 3,103,093 | 9/1963 | House | 56—295 |
| 3,327,460 | 6/1967 | Blackstone | 56—295 |

RUSSELL R. KINSEY, *Primary Examiner.*